United States Patent
Lin et al.

(10) Patent No.: US 10,261,173 B2
(45) Date of Patent: Apr. 16, 2019

(54) METHOD OF PROCESSING FMCW RADAR SIGNAL

(71) Applicant: FINETEK Co., Ltd., New Taipei (TW)

(72) Inventors: I-Chu Lin, New Taipei (TW); Shih-Wei Lu, New Taipei (TW); Chun-Han Huang, New Taipei (TW); Yi-Liang Hou, New Taipei (TW)

(73) Assignee: FINETEK CO., LTD., New Taipei (TW)

( * ) Notice: Subject to any disclaimer, the term of this patent is extended or adjusted under 35 U.S.C. 154(b) by 342 days.

(21) Appl. No.: 15/213,540

(22) Filed: Jul. 19, 2016

(65) Prior Publication Data

US 2017/0328984 A1    Nov. 16, 2017

(30) Foreign Application Priority Data

May 12, 2016 (TW) .............................. 105114788 A

(51) Int. Cl.
  *G01S 7/35*    (2006.01)
  *G01S 7/40*    (2006.01)
  *G01F 23/284*  (2006.01)
  *G01S 13/34*   (2006.01)

(52) U.S. Cl.
  CPC ............ *G01S 7/354* (2013.01); *G01F 23/284* (2013.01); *G01S 7/4021* (2013.01); *G01S 13/34* (2013.01); *G01S 2007/356* (2013.01)

(58) Field of Classification Search
  CPC .. G01F 23/284; G01S 13/34; G01S 2007/356; G01S 7/354; G01S 7/4021

USPC .......................................................... 342/196
See application file for complete search history.

(56) References Cited

U.S. PATENT DOCUMENTS

| | | | | |
|---|---|---|---|---|
| 9,971,021 | B2* | 5/2018 | Moses | G01S 13/9303 |
| 2004/0183719 | A1* | 9/2004 | Natsume | G01S 13/343 342/147 |
| 2009/0015462 | A1* | 1/2009 | Nakanishi | G01S 13/931 342/107 |
| 2014/0142838 | A1* | 5/2014 | Durand | G08G 5/04 701/301 |
| 2015/0268218 | A1* | 9/2015 | Troxler | G01S 13/0209 342/21 |
| 2015/0268328 | A1* | 9/2015 | Johnson | G01S 7/03 342/21 |

* cited by examiner

*Primary Examiner* — Timothy A Brainard
(74) *Attorney, Agent, or Firm* — Chun-Ming Shih; HDLS IPR Services

(57) ABSTRACT

A method of processing FMCW radar signal retrieves a configuring parameter set (120) corresponding to a working environment or a detected material, receives a reflection time-domain signal, executes a time-domain-to-frequency-domain converting process to the reflection time-domain signal for obtaining a reflection frequency-domain signal, executes the corresponded process on the reflection frequency-domain signal according to the configuring parameter set (120), and analyzes the processed reflection frequency-domain signal and generates a detecting result. The present disclosed example can effectively reduce the time of the development and the cost of manufacture via executing the corresponded process according to the configuring parameter set (120) corresponding to the working environment or the detected material.

9 Claims, 13 Drawing Sheets

METHOD OF PROCESSING FMCW RADAR SIGNAL

BACKGROUND OF THE INVENTION

Field of the Invention

The technical field relates to method of processing signal and more particularly related to method of processing FMCW radar signal.

Description of Related Art

In the radar signal processing devices of the related art, a detecting/processing schema of each radar signal processing device is programmed for a specific working environment or specific material.

For example, if the radar signal processing device is applied in a fluid level detection (e.g. detection of the fluid level of a fuel tank), the radar signal processing device must have capability of detecting and processing the signal corresponding to fluid swaying. If the radar signal processing device is applied in a speed measurement in the open space, the radar signal processing device must have capability of detecting and processing the signal corresponding to the background.

Since none of the radar signal processing devices of the related art can meet the requirements for a plurality of working environments or materials, when a user requests a different application, the research and development personnel must re-develop a new dedicated radar signal processing device, and the user must additionally pay for the new dedicated radar signal processing device.

SUMMARY OF THE INVENTION

The present disclosed example is directed to a method of processing FMCW radar signal which is applicable to different working environments or the materials.

One of the exemplary embodiments, a method of processing FMCW radar signal, comprising: a) retrieving a configuring parameter set (120) at an FMCW radar signal processing device (1), wherein the configuring parameter set (120) is corresponded to a working environment where the FMCW radar signal processing device (1) locates or a detected material which the FMCW radar signal processing device (1) detects; b) receiving a reflection time-domain signal; c) executing a time-domain-to-frequency-domain converting process to the reflection time-domain signal to obtain a reflection frequency-domain signal; d) selectively executing at least one of a background-noise-deducting process, a threshold restriction process, a tracking window process, a damping filter process and a dynamic-range-configuring process to the reflection frequency-domain signal according to the configuring parameter set (120); and e) analyzing the processed signal and generating a detecting result.

Via executing the corresponded process according to the configuring parameter set corresponding to the working environment or the detected material, the present disclosed example can make the same radar device fast be applicable to different working environment or the detected material via replacing the configuring parameter set, and can effectively reduce the time of the development and the cost of manufacture.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

Figure 1:
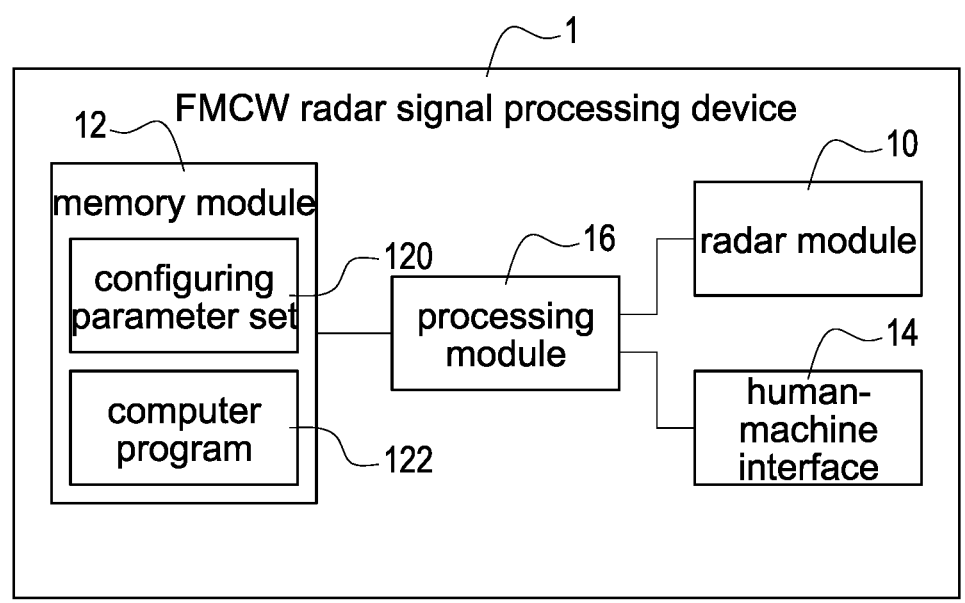
FIG. 1 is an architecture diagram of an FMCW radar signal processing device according to a first embodiment of the present disclosed example.

First, please refer to FIG. 1, which illustrates an FMCW radar signal processing device according to a first embodiment of the present disclosed example. The present disclosed example discloses a method of processing Frequency Modulation Continues Wave (FMCW) radar signal (hereinafter processing method for abbreviation) which is applied to an FMCW radar signal processing device 1 (hereinafter processing device 1 for abbreviation) as shown in the FIG. 1. In the present disclosed example, the processing device 1 comprises a radar module 10, a memory module 12, a human-machine interface (HMI) 14 and a processing module electrically connected to above-mentioned elements.

The radar module 10 generates and emits a scan radar signal, and receives the reflected radar signal as a reflection time-domain signal. Preferably, the radar module 10 is FMCW radar, and can continuously switch the scan frequency over time during emitting the scan radar signal. Thus, the scan radar signal comprises the scan frequencies based on time, and the reflected time-domain signal comprises the scan reflection frequencies respectively corresponding to the scan frequencies.

Memory module 12 is used to store data. Preferably, the memory module 12 stores at least one configuring parameter set 120, wherein each configuring parameter set 120 is respectively corresponded to the different working environments or detected material.

The human-machine interface 14, e.g. keyboard, mouse, display, speaker or any combination of above-mentioned devices, is used to receive input operation or output information.

Processing module 16 is used to control processing device 1. Preferably, the processing module 16 can receive user operation via the human-machine interface 14 to configure at least one configuring parameter set 120 or select the specific configuring parameter set 120 from the plurality of the configuring parameter set 120 as the basis of following execution. Besides, the processing module 16 can execute analysis and process to the received reflection time-domain signal according to the selected configuring parameter set 120, generate a detecting result and output the detecting result to the human-machine interface 14.

Please note that the processing method of each embodiment may be implemented by hardware modules like semiconductor, electronic circuit or integrated circuit with recorded digital circuits, or implemented by software modules, e.g. firmware or application program, but are not limited to aforementioned examples.

When the processing method are implemented by software modules, the memory module 12 can further store a computer program 122, the computer program 122 contains computer-executable program codes or machine codes. When the processing module 16 executes computer program 122, the processing module 16 can perform each step of the processing method of each embodiment of the present disclosed example.

Figure 2:
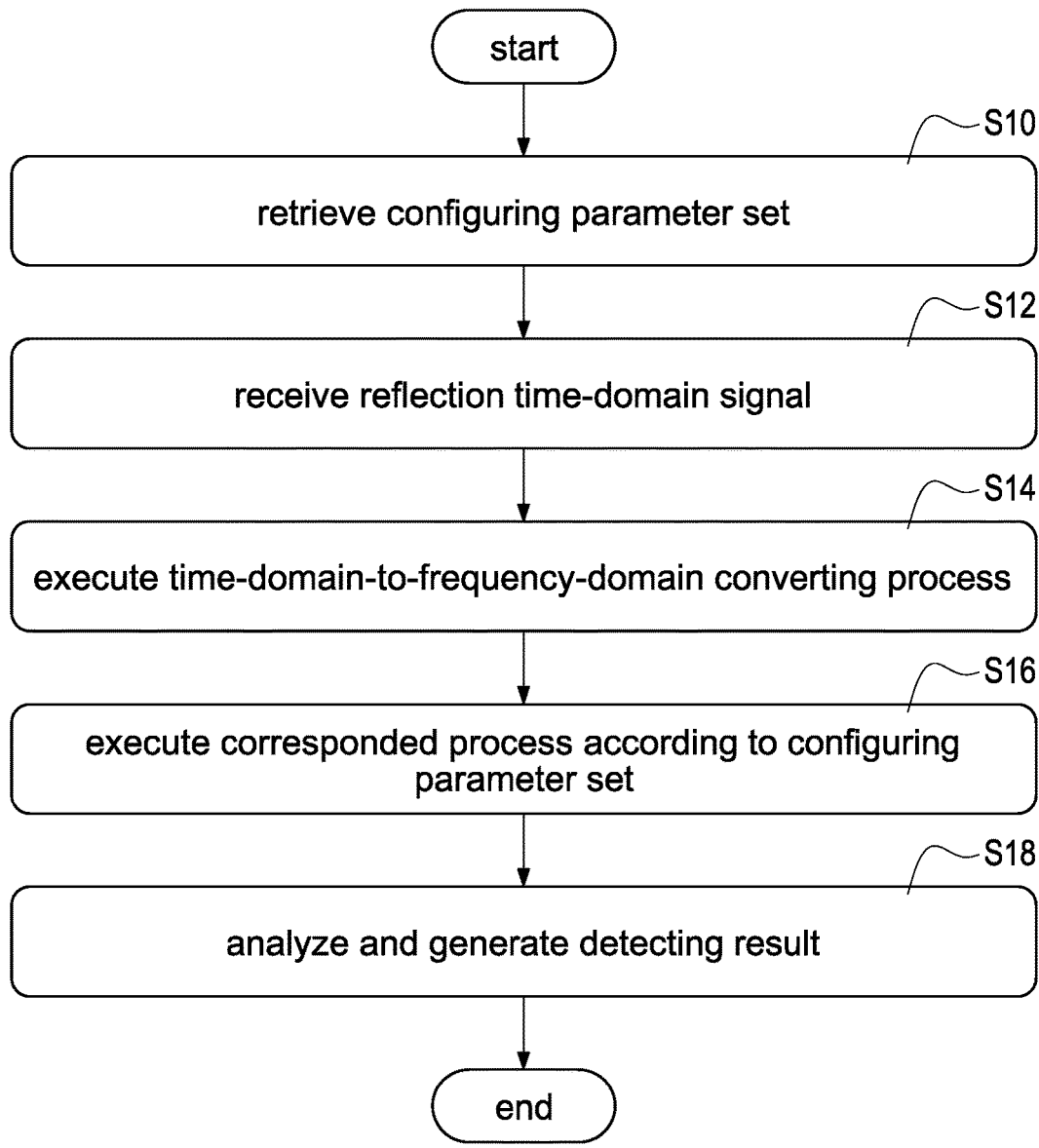
FIG. 2 is a flowchart of a method of processing FMCW radar signal according to a first embodiment of the present disclosed example.

Please refer to FIG. 2, which illustrates a flowchart of a method of processing FMCW radar signal according to a first embodiment of the present disclosed example. The processing method of this embodiment comprises following steps.

Step S10: the processing module 16 reads the corresponded configuring parameter set 120 from the memory module 12, wherein the read configuring parameter set 120 is corresponded to a working environment where the processing device 1 locates or a detected material which the processing device 1 detects currently.

For example, the memory module 12 can store four configuring parameter sets 120. The first configuring parameter set 120 is used to the first working environment (e.g. detection of the variation of tidal height), the second configuring parameter set 120 is used to the second working environment (e.g. human detection for military base around), the third configuring parameter set 120 is used to the first detected material (e.g. the fluid level of a fuel tank), and the forth configuring parameter set 120 is used to the second detected material (e.g. the fluid level of a water tower).

The processing module 16 can automatically recognize the current working environment or detected material (take the fluid level of the fuel tank for example), and read the corresponded configuring parameter set 120 corresponding to the current working environment or detected material according to a recognizing result (take the third configuring parameter set 120 for example). Or, the processing module 16 can read the configuring parameter set 120 corresponding to a user's selection according to the a selection operation inputted by the user.

Step S12: the processing module 16 receives a reflection time-domain signal via the radar module 10, wherein above-mentioned reflection time-domain signal is a distance-time based signal.

Step S14: the processing module 16 executes a time-domain-to-frequency-domain converting process to the received reflection time-domain signal to obtain a reflection frequency-domain signal, wherein the reflection frequency-domain signal is an intensity-frequency based signal. Preferably, above-mentioned time-domain-to-frequency-domain converting process is Fast Fourier Transform (FFT), Wavelet Transform, Discrete Fourier Transform (DFT) or Discrete Cosine Transform (DCT).

Step S16: the processing module 16 executes a corresponded process to the reflection frequency-domain signal according to the read configuring parameter set 120.

More specifically, the configuring parameter set 120 comprises a set of processing configuring parameters which are suitable for the current working environment or detected material; the processing configuring parameters are used to indicate the processing module 16 to execute all or a part of a plurality of the processes to the reflection frequency-domain signal. Besides, the memory module 12 further stores the executing rules of all the processes.

Preferably, the memory module 12 can store the processing rules of at least one of a background-noise-deducting process, a threshold restriction process, a tracking window process, a damping filter process and a dynamic-range-configuring process.

For example, when the configuring parameter set 120 is corresponded to the application of detecting the fluid level of the fuel tank or the water tower, the processing configuring parameters of the configuring parameter set 120 can be used to indicate the processing module 16 to execute the damping filter process so as to make the processing module 16 only execute the damping filter process to the reflection frequency-domain signal for filtering off the signal generated by the fluid of the specific detected material swaying, and not execute the other processes.

In another example, when the configuring parameter set 120 is corresponded to the application of human detection for military base around, the processing configuring parameters of the configuring parameter set 120 can be used to indicate the processing module 16 to execute the background-noise-deducting process so as to make the processing module 16 only execute the background-noise-deducting process to the reflection frequency-domain signal for filtering off the signal generated by the background, and not execute the other processes.

Thus, via changing the configuring parameter set 12, the user can make the processing device 1 execute the different process so as to make the processing device 1 be applicable to another different working environment or detected material.

Step S18: the processing module 16 analyzes the processed reflection frequency-domain signal and generates a detecting result.

For example, when the configuring parameter set 120 is corresponded to the application of detecting the fluid level, the processing module 16 can calculate the distance between the signal source (the processing device 1) and the fluid surface according to the time difference between the scan frequency of the scan radar signal and the same reflection frequency of the reflection frequency-domain signal, and make the distance as the detecting result. When the configuring parameter set 120 is corresponded to the application of speed measurement in the open space, the processing module 16 can calculate the speed of a detected object according to the frequency difference between the scan frequency of the scan radar signal and the same reflection frequency of the reflection frequency-domain signal, and make the speed as the detecting result.

Via executing the corresponded process according to the configuring parameter set corresponding to the current working environment or detected material, this present disclosed example can change the configuring parameter set to make the signal processing device fast be applicable to the different working environment or detected material so as to reduce the time of the development and the cost of manufacture.

Figure 3:
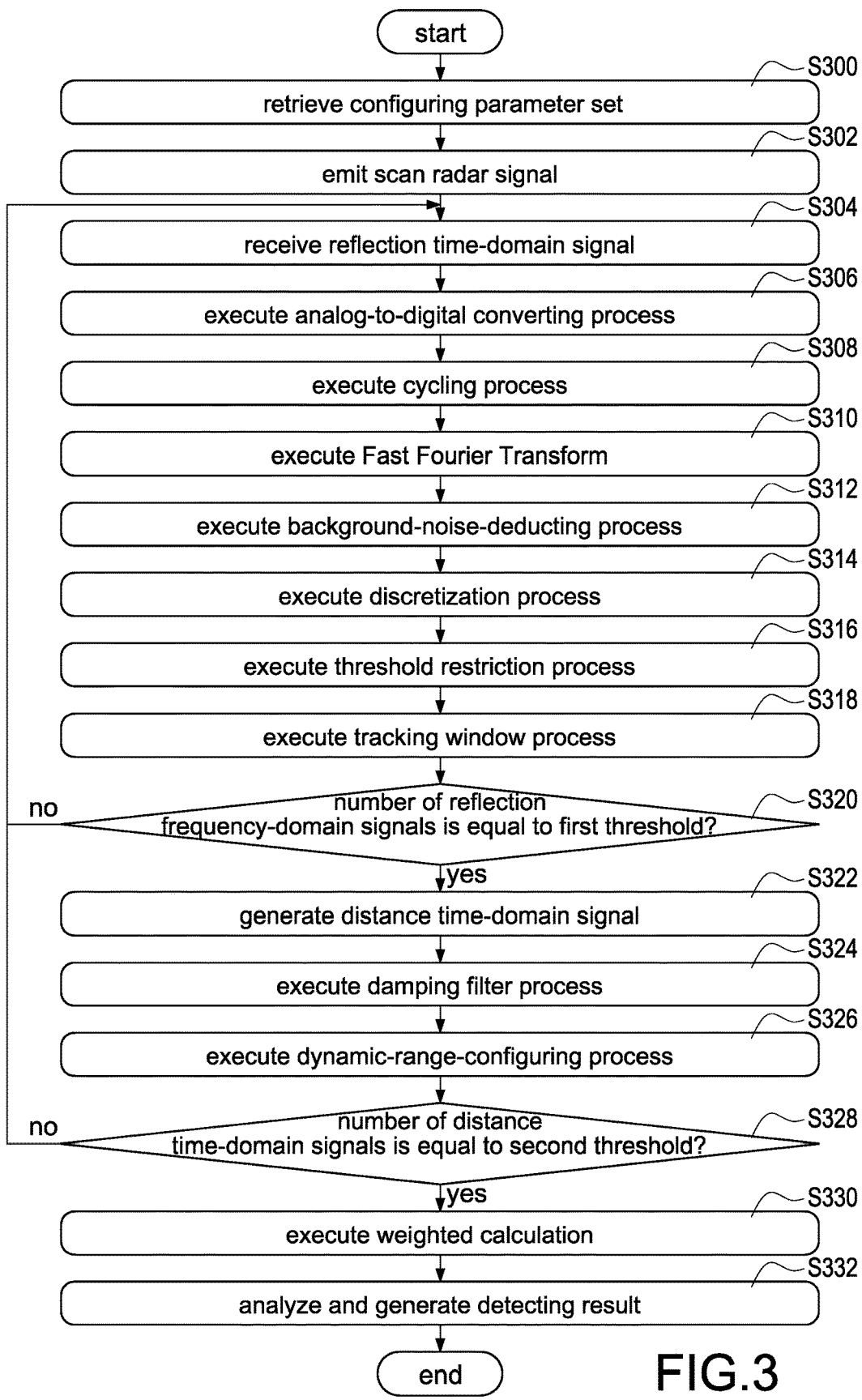
FIG. 3 is a flowchart of a method of processing FMCW radar signal according to a second embodiment of the present disclosed example.

Please refer to FIG. 3, which illustrates a flowchart of a method of processing FMCW radar signal according to a second embodiment of the present disclosed example. In this embodiment, the processing configuring parameters of the configuring parameter set 120 indicates the processing module 16 to execute the background-noise-deducting process, the threshold restriction process, the tracking window process, the damping filter process and the dynamic-range-configuring process. The processing method of this embodiment comprises following steps.

Step S300: the processing module 16 retrieves the configuring parameter set 120 corresponding to the current working environment or detected material.

Step S302: the processing module 16 emits the scan radar signal via the radar module 10. Preferably, the configuring parameter set 120 comprises a frequency-switching time and a plurality of the scan frequency values. The processing module 16 emits the scan radar signal in the way of frequency modulation continues wave according to the plurality of the scan frequency values and the frequency-switching time.

Step S304: the processing module 16 receives the analog reflection time-domain signal.

Step S306: the processing module 16 executes an analog-to-digital converting process to the analog reflection time-domain signal to convert the analog reflection time-domain signal into the digital reflection time-domain signal so as to make the following process become easy and executable.

Step S308: the processing module 16 executes a cycling process to the digital reflection time-domain signal to reduce an intensity of an incomplete cycle part of the reflection time-domain signal.

More specifically, if the reflection time-domain signal's cycle is incomplete (in other words, an intensity of an initial part of the signal is discontinuous with an intensity of an end part of the signal), the Spectral Leakage effect will occur when subsequently executing a time-domain-to-frequency-domain converting process to the reflection time-domain signal so as to fail to retrieve the accurate intensity of the reflection frequency.

Via executing the cycling process to weaken the intensity of the incomplete cycle part of the reflection time-domain signal, the present disclosed example can effectively reduce the negative effects of the Spectral Leakage effect when executing the time-domain-to-frequency-domain converting process so as to make the result of the time-domain-to-frequency-domain converting process more accurate Preferably, the processing module 16 executes the cycling process to the reflection time-domain signal via using a window function (e.g. Hanning Window function). Furthermore, the window function is corresponded to a numeric sequence having the greater number(s) in center and the zero-approaching numbers in both side edges. After the reflection time-domain signal is processed by the cycling process, both the intensity of the initial part of the processed reflection time-domain signal and the intensity of the end part of the processed reflection time-domain signal approach to zero, and are approximately continuous. In other words, because the intensity of the incomplete cycle part of the reflection time-domain signal is weakened, the result of the following process will be more accurate.

Step S310: the processing module 16 executes the Fast Fourier Transform to the reflection time-domain signal to obtain a reflection frequency-domain signal.

Step S312: the processing module 16 executes the background-noise-deducting process to the reflection frequency-domain signal to filter out the background noise in the reflection frequency-domain signal.

Step S314: the processing module 16 executes a discretization process to the reflection frequency-domain signal to convert the continuous reflection frequency-domain signal into the dispersed reflection frequency-domain signal.

Preferably, the reflection frequency-domain signal after the discretization process can be represented in dispersed data type having smaller data size as the manner processed by the Discrete Fourier Transform.

Via executing the discretization process to the reflection frequency-domain signal, the present disclosed example can effectively reduce the data size. Besides, the dispersed reflection frequency-domain signal is applicable to more type of digital signal processing.

Step S316: the processing module 16 executes the threshold restriction process to the dispersed reflection frequency-domain signal to make the reflection frequency which having an abnormal intensity (e.g. too high or too low) as noise and filter out the reflection frequency. Step S318: the processing module 16 executes the tracking window process to the reflection frequency-domain signal so as to capture at least one main reflection frequency from the reflection frequency-domain signal.

The processing method of this embodiment can further simultaneously execute a correcting process to the reflection frequency-domain signals. More specifically, the configuring parameter set 120 comprises a receiving threshold. Above-mentioned receiving threshold is used to indicate the number of the reflection frequency-domain signals which will be simultaneously processed. The processing method of this embodiment further comprises following steps.

Step S320: the processing module 16 determines whether the number of the received (processed) reflection frequency-domain signals is equal to a first threshold (above-mentioned receiving threshold) of the configuring parameter set 12, e.g. ten.

If the number of received reflection frequency-domain signals is equal to the first threshold, the processing module 16 performs a step S322. Otherwise, the processing module 16 performs the step S304 to S318 again so as to receive and process another reflection frequency-domain signal.

Step S322: the processing module 16 generates a distance time-domain signal according to the reflection frequency-domain signals. More specifically, the processing module converts the reflection frequency-domain signals based on frequency-domain into the distance time-domain signal based on time-domain according to the receiving time of each reflection frequency-domain signal.

Step S324: the processing module 16 executes the damping filter process to the distance time-domain signal so as to make the plurality of the distance values corresponding to different time of the distance time-domain signals approach to the same value.

Step S326: the processing module 16 executes the dynamic-range-configuring process to the distance time-domain signal so as to determine a dynamic range and filter out the distance value(s) out of the dynamic range.

Step S328: the processing module 16 determines whether the number of the retrieved distance time-domain signals is equal to a second threshold (above-mentioned receiving threshold) of the configuring parameter set 12, e.g. ten.

If the number of the retrieved distance time-domain signals is equal to the second threshold, the processing module 16 performs a step S330. Otherwise, the processing module 16 performs the step S304 to the step S326 again so as to receive and process the reflection frequency-domain signals for retrieving another distance time-domain signal.

Step S330: the processing module 16 executes a weighted calculation to the retrieved distance time-domain signals according to the weighted factors of the configuring parameter set 120 so as to combine the distance time-domain signals to an output signal, wherein the factor number of the weighted factors is corresponded to the number of the distance time-domain signals.

For example, if the 5 distance time-domain signals are {S1,S2,S3,S4,S5}, and the weighted factors are {0.9,0.025, 0.025,0.025,0.025}, the output signal is below:

$$Sout=0.9S1+0.025 \times S2+0.025 \times S3+0.025 \times S4+0.025 \times S5.$$

Step S332: the processing module 16 analyzes the output signal and generates a detecting result.

Please be noted that although the processing configuring parameters of the configuring parameter set 120 indicate that executing all the process (comprising the background-noise-deducting process, the threshold restriction process, the tracking window process, the damping filter process and the dynamic-range-configuring process) in this embodiment, but this specific example is not intended to limit the scope of the present disclosed example. The person having ordinary skill in the art of the present disclosed example can arbitrarily modify this embodiment into only executing a part of processes according to the person's requirement.

Figure 4:
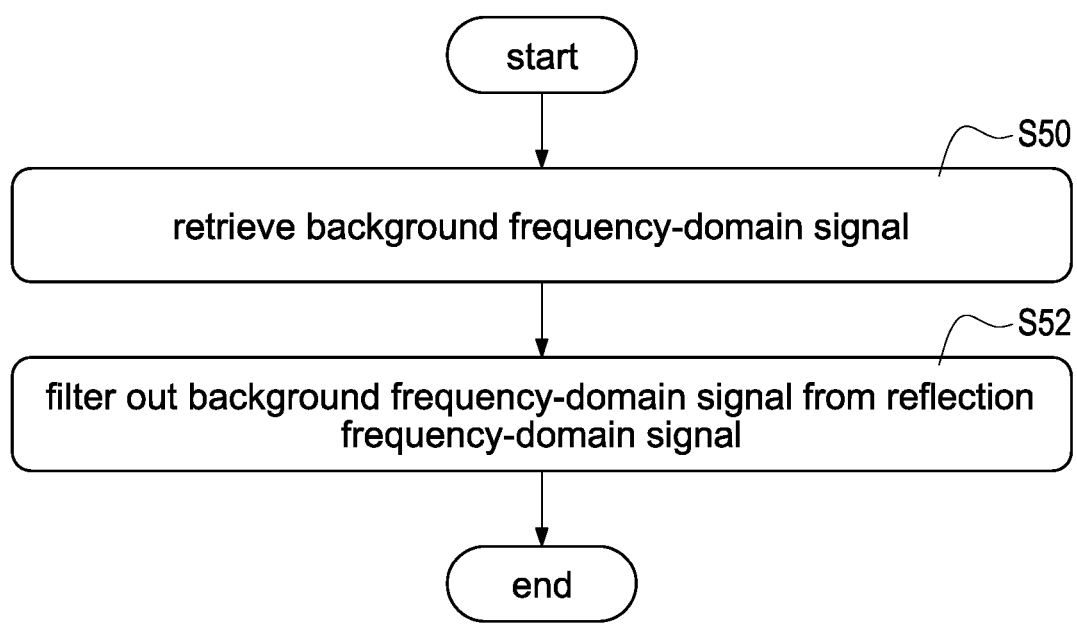
FIG. 4 is a flowchart of a background-noise-deducting process according to a first embodiment of the present disclosed example.
Figure 5:
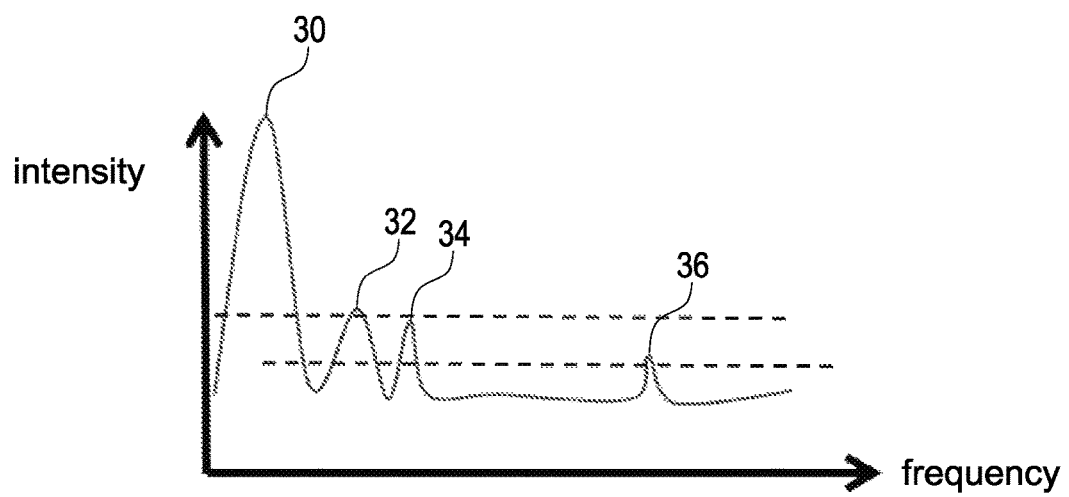
FIG. 5 is a schematic view of the signal without a background-noise-deducting process.
Figure 6:
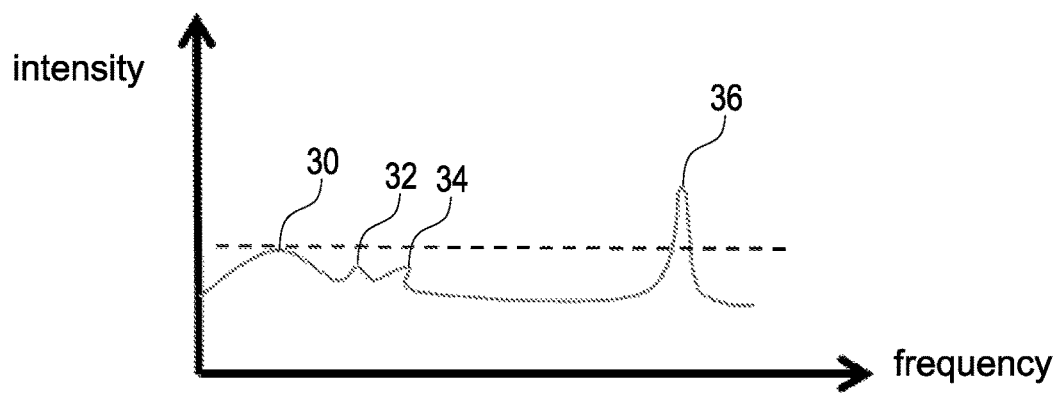
FIG. 6 is a schematic view of the signal after a background-noise-deducting process.

Please simultaneously refer to FIG. 4 to FIG. 6, FIG. 4 illustrates a flowchart of a background-noise-deducting process according to a first embodiment of the present disclosed example, FIG. 5 illustrates a schematic view of the signal without a background-noise-deducting process, FIG. 6 illustrates a schematic view of the signal after a background-noise-deducting process. Those figures are used to describe a better embodiment of the background-noise-deducting process of the present disclosed example. The background-noise-deducting process of this embodiment comprises following steps.

Step S50: the processing module 16 retrieve background frequency-domain signal.

Preferably, above-mentioned background frequency-domain signal doesn't comprise the signal of the detected object. More specifically, the processing device 1 scans the working environment to obtain the background frequency-domain signal when the detected object doesn't locate in the working environment.

Or, the processing module 16 can generate the background frequency-domain signal via analyzing a comparison among the reflection frequency-domain signals. For example, the processing module 16 compares the reflection frequencies of the reflection frequency-domain signal, and determines that the reflection frequency having the smaller intensity change than the others is the background frequency of the background frequency-domain signal.

Step S52: the processing module 16 filters out the background frequency-domain signal from the reflection frequency-domain signal to remove or weaken the background noise.

As shown in FIG. 5, in the signal reflection frequency-domain signal without the background-noise-deducting process, the intensity of the background frequencies 30-34 are far greater than the intensity of the reflection frequency 36 corresponding to the detected object so as to make the processing module 16 be difficult to analyze the reflection frequency 36 having the weaker intensity.

As shown in FIG. 6, in the signal reflection frequency-domain signal processed by the background-noise-deducting process, not only the intensity of the reflection frequency 36 is increased, but also the intensity of the background frequencies 30-34 is significantly weakened so as to make the intensity of the reflection frequency 36 is significantly greater than the intensity of the background frequencies 30-34 and make the following analysis become easy and executable.

Figure 7:
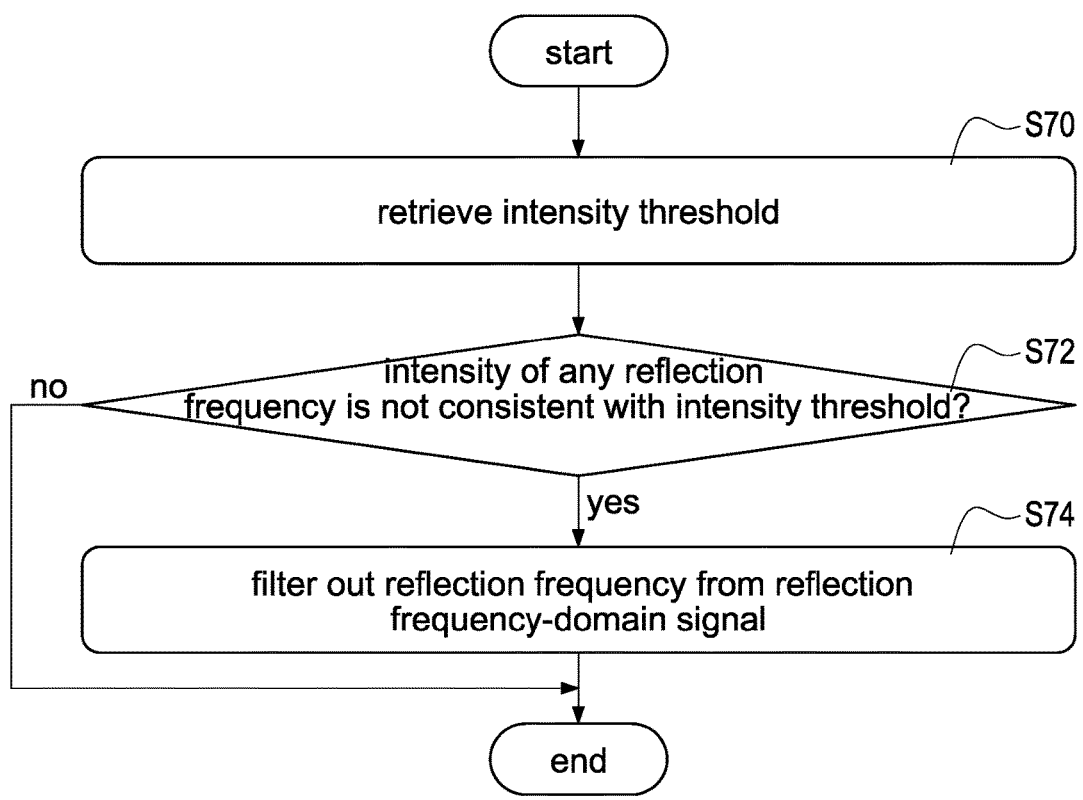
FIG. 7 is a flowchart of a threshold restriction process according to a first embodiment of the present disclosed example.
Figure 8:
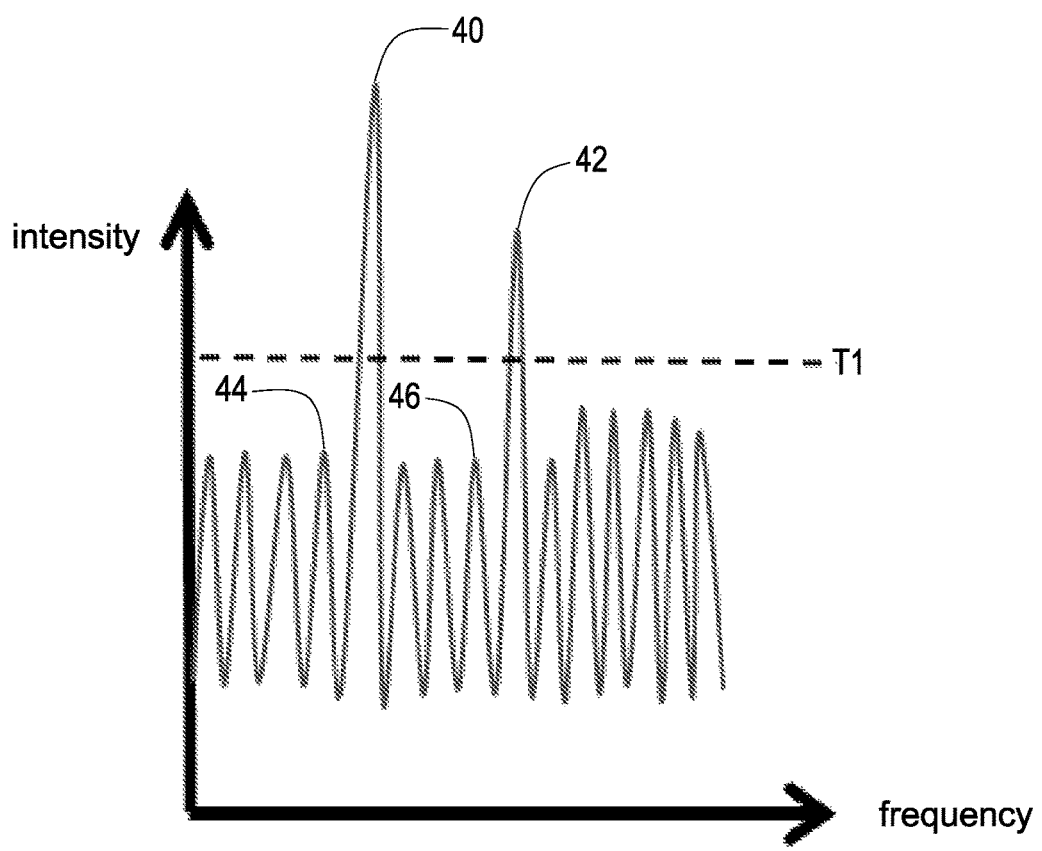
FIG. 8 is a schematic view of the signal without a threshold restriction process.
Figure 9:
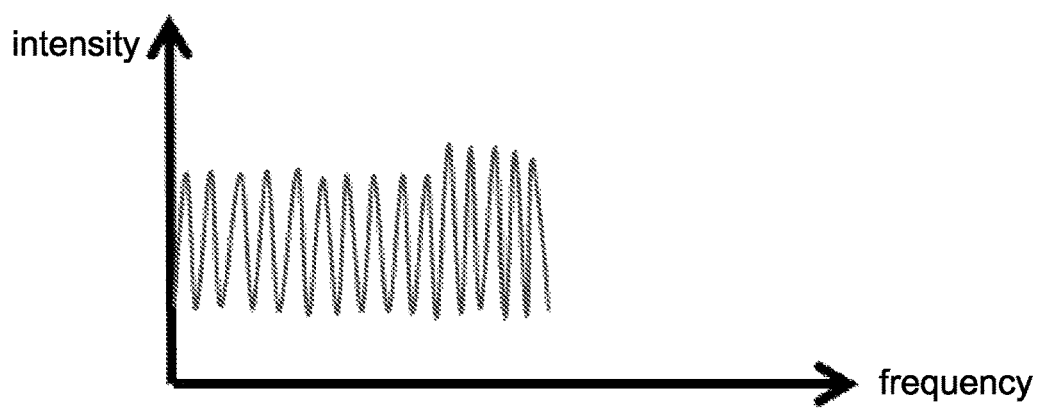
FIG. 9 is a schematic view of the signal after a threshold restriction process.

Please simultaneously refer to FIG. 7 to FIG. 9, FIG. 7 illustrates a flowchart of a threshold restriction process according to a first embodiment of the present disclosed example, FIG. 8 illustrates a schematic view of the signal without a threshold restriction process, FIG. 9 illustrates a schematic view of the signal after a threshold restriction process. Those figures are used to describe a better embodiment of the threshold restriction process of the present disclosed example. The threshold restriction process of this embodiment comprises following steps.

Step S70: the processing module 16 retrieves an intensity threshold of the configuring parameter set 120.

Preferably, the processing module 16 retrieves a first intensity threshold and a second intensity threshold, wherein the first intensity threshold is greater than the second intensity threshold.

Step S72: the processing module 16 determines whether the intensity of any reflection frequency is not consistent with the intensity threshold.

Preferably, the processing module 16 determines whether the intensity of any reflection frequency is not consistent with the intensity threshold according to whether the intensity of any reflection frequency is greater than the first intensity threshold or less than the second intensity threshold.

If the intensity of any reflection frequency is not consistent with the intensity threshold, the processing module 16 performs a step S74. Otherwise, the processing module 16 terminates the threshold restriction process.

Step S74: the processing module 16 filters out the reflection frequency with intensity not consistent with the intensity threshold from the reflection frequency-domain signal.

As shown in FIG. 8, the reflection frequencies should be the same each other, however, because of the measurement error, in the reflection frequency-domain signal without the threshold restriction process, the intensity of the reflection frequencies 40, 42 are far greater than the intensity of the other reflection frequencies (such as the reflection frequencies 44, 46), above-mentioned intensity difference will cause the error and reduce the accuracy of following analysis.

As shown in FIG. 9, in the reflection frequency-domain signal after the threshold restriction process, the intensity of the reflection frequencies 40, 42 had been filtered. Besides, the processing device 1 further respectively makes the intensity of the reflection frequencies 44, 46 as the new intensity of the reflection frequencies 40, 42. Thus, the threshold restriction process can effectively reduce the intensity difference between the reflection frequencies and increase the accuracy of following analysis.

Figure 10:
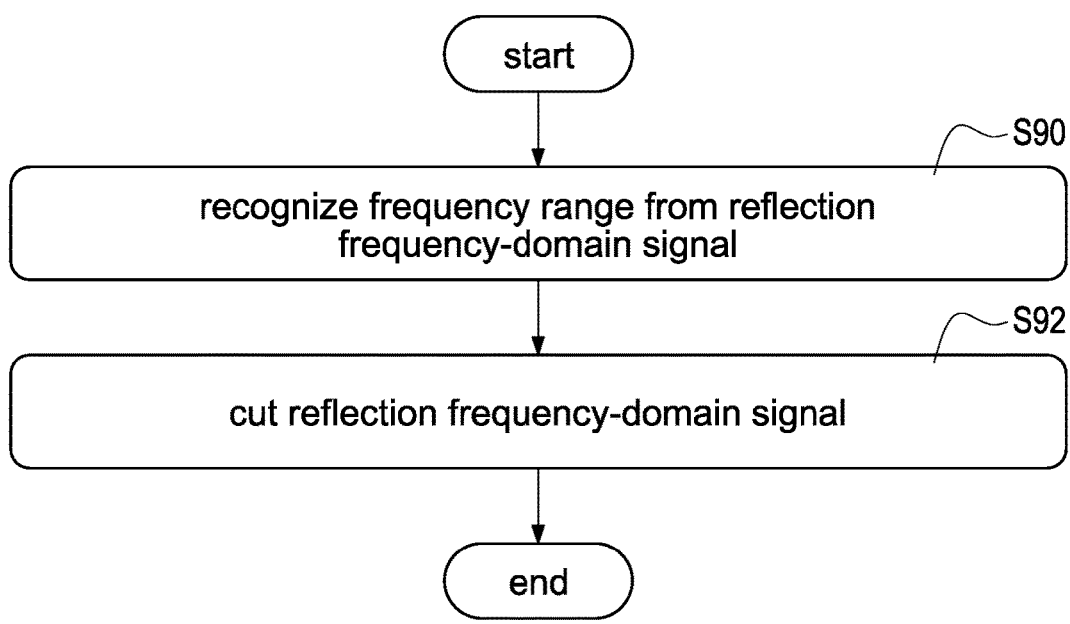
FIG. 10 is a flowchart of a tracking window process according to a first embodiment of the present disclosed example.
Figure 11:
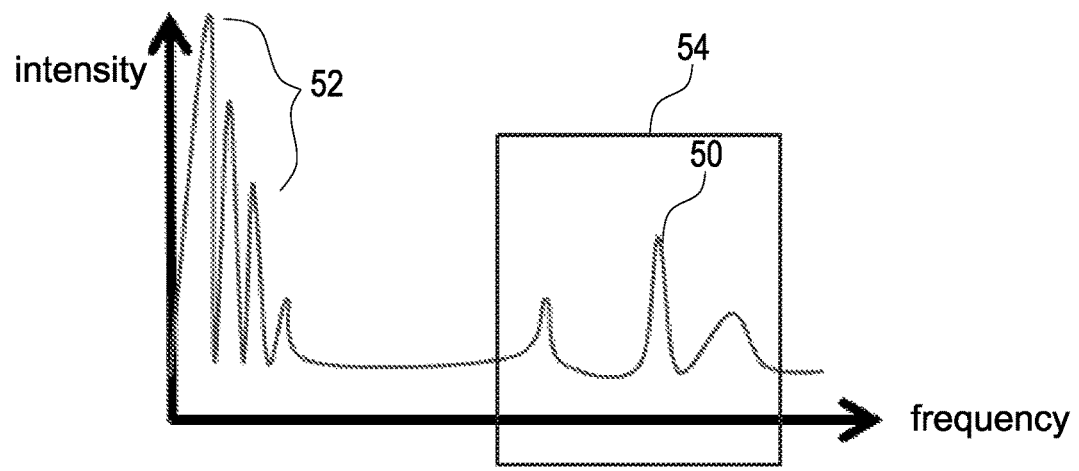
FIG. 11 is a schematic view of the signal without a tracking window process.
Figure 12:
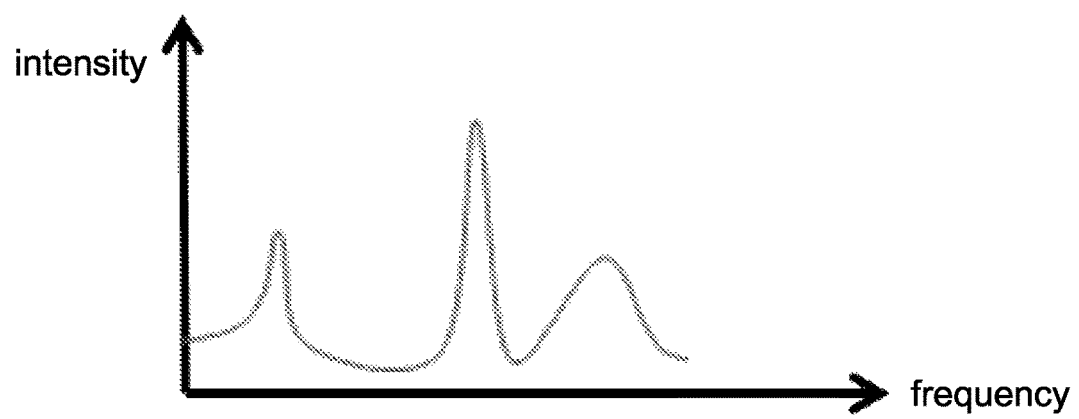
FIG. 12 is a schematic view of the signal after a tracking window process.

Please simultaneously refer to FIG. 10 to FIG. 12, FIG. 10 illustrates a flowchart of a tracking window process according to a first embodiment of the present disclosed example, FIG. 11 illustrates a schematic view of the signal without a tracking window process, FIG. 12 illustrates a schematic view of the signal after a tracking window process. Those figures are used to describe a better embodiment of the tracking window process of the present disclosed example. The tracking window process of this embodiment comprises following steps.

Step S90: the processing module 16 recognizes a frequency range from the reflection frequency-domain signal. Preferably, above-mentioned frequency range is corresponded to the scan frequency values of the configuring parameter set 120.

Step S92: the processing module 16 cuts the reflection frequency-domain signal so as to make the cut reflection frequency-domain signal only comprise the frequency range recognized in the step S90.

As shown in FIG. 11, the reflection frequency-domain signal should comprise only the main signal, however, because of the measurement error, the reflection frequency-domain signal without the tracking window process comprises not only the main signal (such as reflection frequency 50), but also a lot of noise (such as reflection frequency 52), above-mentioned result not only makes the reflection frequency-domain signal have a bigger data size, but also reduces the accuracy of following analysis.

As shown in FIG. 12, the reflection frequency-domain signal after the tracking window process only comprises the main signal within the frequency range 54; above-mentioned result not only significantly reduces the data size of the reflection frequency-domain signal, but also increases the accuracy of following analysis.

Figure 13:
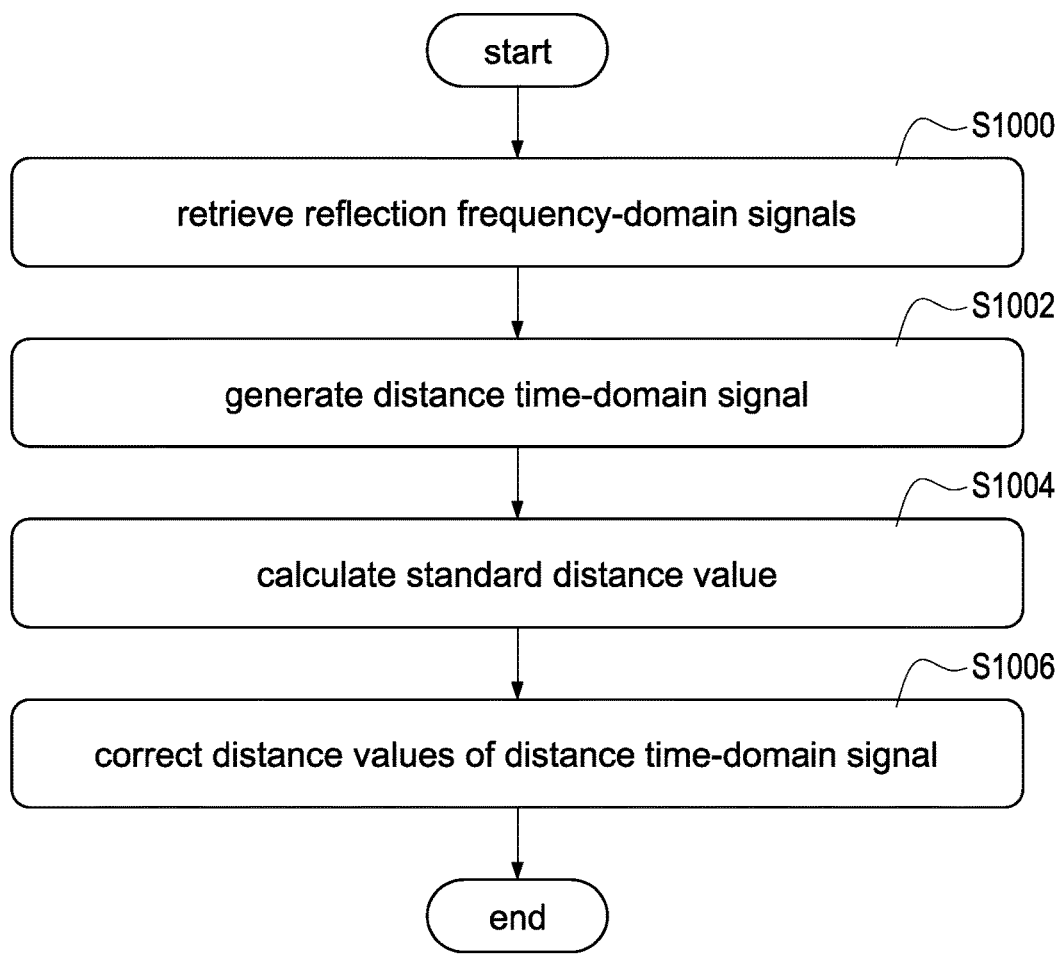
FIG. 13 is a flowchart of a damping filter process according to a first embodiment of the present disclosed example.
Figure 14:
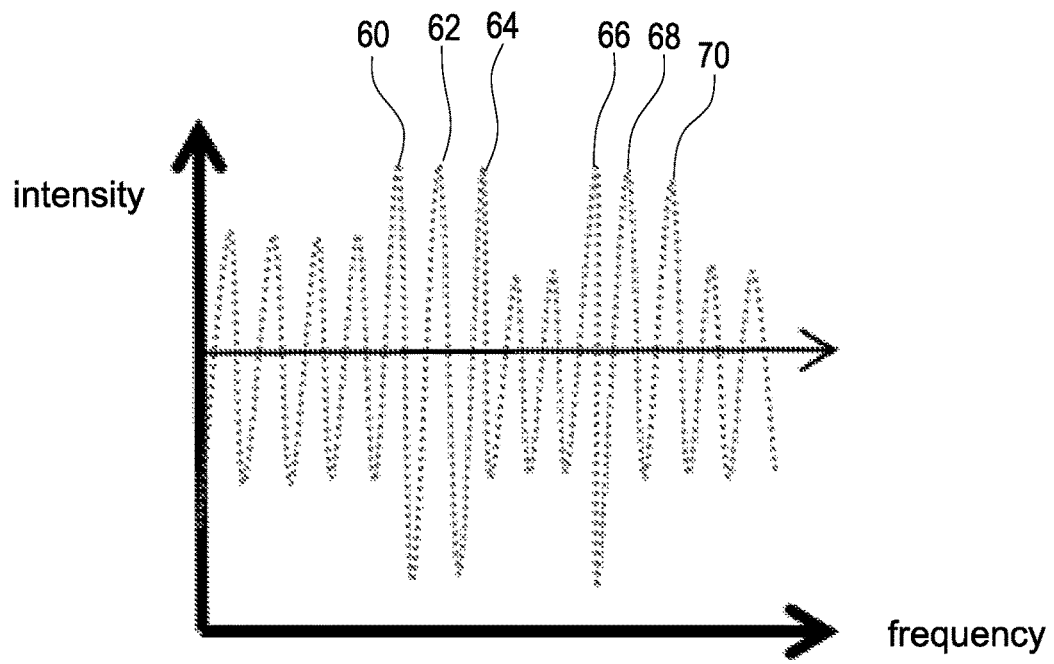
FIG. 14 is a schematic view of the signal without a damping filter process.
Figure 15:
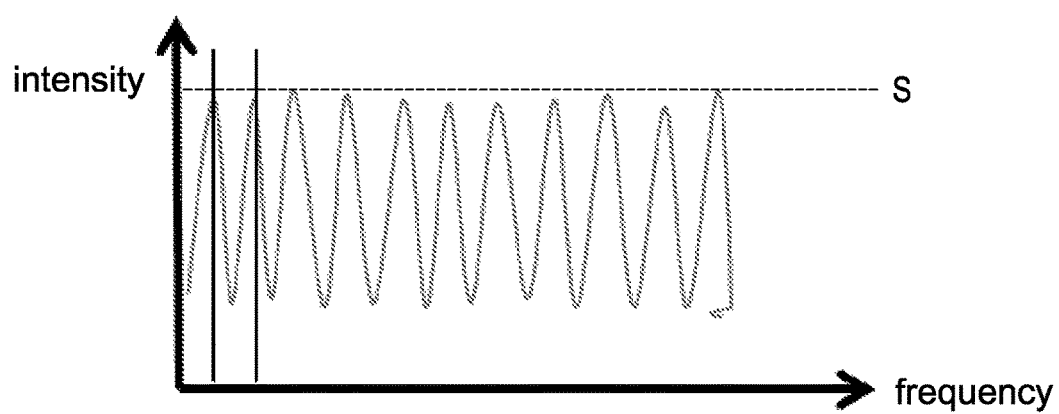
FIG. 15 is a schematic view of the signal after a damping filter process.

Please refer to FIG. 13 to FIG. 15, FIG. 13 illustrates a flowchart of a damping filter process according to a first embodiment of the present disclosed example, FIG. 14 illustrates a schematic view of the signal without a damping filter process, FIG. 15 illustrates a schematic view of the signal after a damping filter process. Those figures are used to describe a better embodiment of the damping filter process of the present disclosed example. The damping filter process of this embodiment comprises following steps.

Step S1000: the processing module 16 retrieves the reflection frequency-domain signals.

Step S1002: the processing module 16 generates a distance time-domain signal according to the reflection frequency-domain signals. Preferably, the processing module 16 combines the reflection frequency-domain signals to the single distance time-domain signal according to the receiving time of the reflection frequency-domain signals.

Step S1004: the processing module 16 calculates a standard distance value S according to a plurality of the distance values of the distance time-domain signal. Preferably, the processing module 16 makes an average value of the plurality of the distance values as the standard distance value S.

Step S1006: the processing module 16 corrects the plurality of the distance values of the distance time-domain signal according to the calculated standard distance value S so as to make the plurality of the distance values approach to the standard distance value S.

As shown in FIG. 14, the plurality of the distance values of the distance time-domain signal should be the same each other, however, because of the measurement error, the distance values 60-70 of the distance time-domain signal before process is far greater than the other distance values, above-mentioned result reduces the accuracy of following analysis.

As shown in FIG. 15, in the distance time-domain signal after the damping filter process, all the distance values will approach to the same (and approach to the standard distance value S); above-mentioned result reduces the effect caused by the error and increases the accuracy of following analysis.

Figure 16:
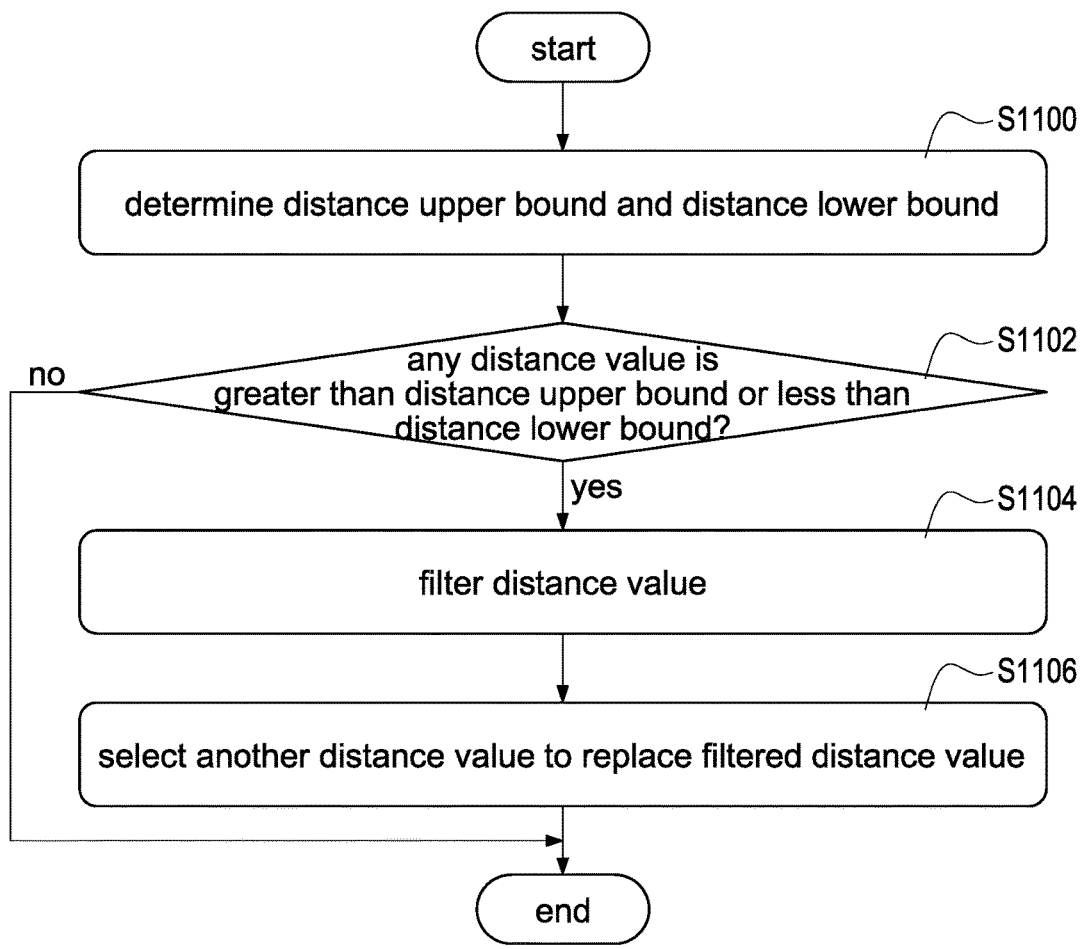
FIG. 16 is a flowchart of a dynamic-range-configuring process according to a first embodiment of the present disclosed example.
Figure 17:
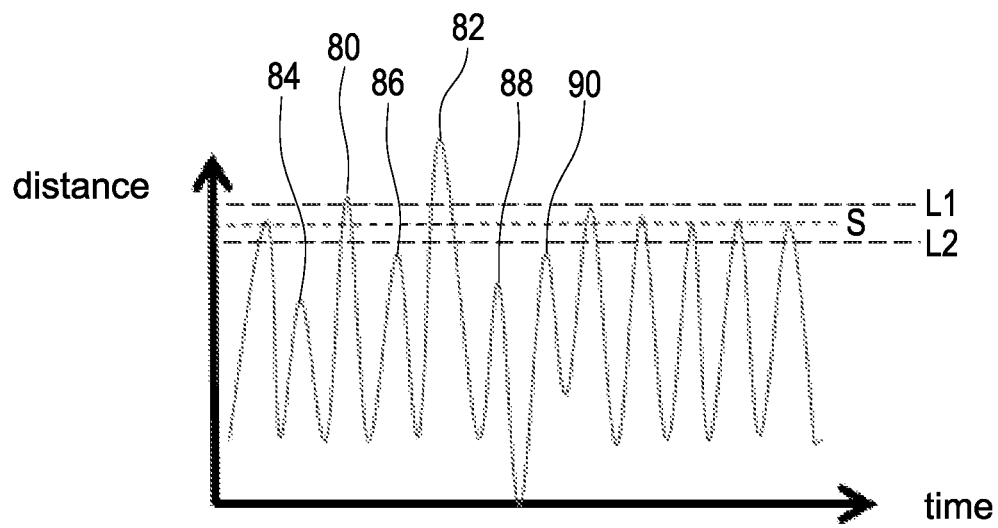
FIG. 17 is a schematic view of the signal without a dynamic-range-configuring process.
Figure 18:
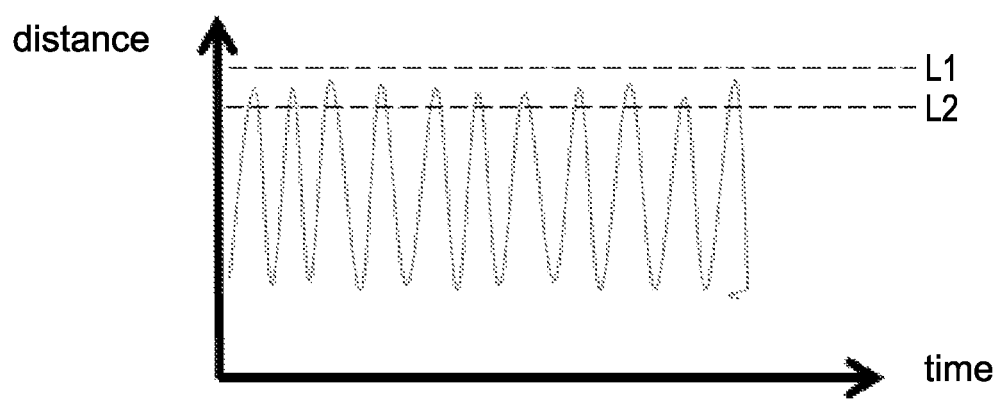
FIG. 18 is a schematic view of the signal after a dynamic-range-configuring process.

Please refer to FIG. 16 to FIG. 18, FIG. 16 illustrates a flowchart of a dynamic-range-configuring process according to a first embodiment of the present disclosed example, FIG. 17 illustrates a schematic view of the signal without a dynamic-range-configuring process, FIG. 18 illustrates a schematic view of the signal after a dynamic-range-configuring process. Those figures are used to describe a better embodiment of the dynamic-range-configuring process of the present disclosed example. The dynamic-range-configuring process of this embodiment comprises following steps.

Step S1100: the processing module 16 determines a distance upper bound L1 and a distance lower bound L2 according to the standard distance value S and an allowance value of the configuring parameter set 120.

Preferably, the processing module 16 sets the distance upper bound L1 as the standard distance value S plus the allowance value together, and sets the distance lower bound L2 as subtracting the allowance value from the standard distance value S.

Step S1102: the processing module 16 determines whether any distance value of the distance time-domain signal is greater than the distance upper bound L1 or less than the distance lower bound L2.

If any distance value of the distance time-domain signal is greater than the distance upper bound L1 or less than the distance lower bound L2, the processing module 16 performs a step S1104. Otherwise the processing module 16 terminates the dynamic-range-configuring process.

Step S1104: the processing module 16 filters out the distance value which is greater than the distance upper bound L1 or less than the distance lower bound L2 from the distance time-domain signal.

Step S1106: the processing module 16 selects another distance value of the same distance time-domain signal to replace the filtered distance value. Preferably, the selected distance value is not greater than the distance upper bound L1 and not less than the distance lower bound L2.

As shown in FIG. 17, the plurality of the distance values of the distance time-domain signal after the damping filter process without the dynamic-range-configuring process still have some error, e.g. the distance values 80-90 of the distance time-domain signal are significantly different with the other distance values, above-mentioned result reduces the accuracy of following analysis.

As shown in FIG. 18, in the distance time-domain signal after the dynamic-range-configuring process, all the distance values 80,82 which are greater than the distance upper bound L1 and the distance values 84-90 which are less than the distance lower bound L2 had been filtered. Besides, the processing device 1 can further select another distance value which is not greater than the distance upper bound L1 and not less than the distance lower bound L2 to replace the filtered distance values 80-90. Thus, the dynamic-range-configuring process can make all distance values of the distance time-domain signal approach to the same value (within the range of the distance upper bound L1 to the distance lower bound L2), above-mentioned result reduces the effect caused by the error and increases the accuracy of following analysis.

The above mentioned are only preferred specific examples in the present disclosed example, and are not thence restrictive to the scope of claims of the present disclosed example. Therefore, those who apply equivalent changes incorporating contents from the present disclosed example are included in the scope of this application, as stated herein.

What is claimed is:

1. A method of processing frequency modulation continuous wave (FMCW) radar signal, comprising:
   a) retrieving a configuring parameter set (120) at an FMCW radar signal processing device (1), wherein the configuring parameter set (120) is corresponded to a working environment where the FMCW radar signal processing device (1) locates or a detected material which the FMCW radar signal processing device (1) detects;
   b) receiving a reflection time-domain signal;
   c) executing a time-domain-to-frequency-domain converting process to the reflection time-domain signal to obtain a reflection frequency-domain signal;
   d) executing a background-noise-deducting process to the reflection frequency-domain signal;
   e) executing a discretization process to the reflection frequency-domain signal to obtaining the reflection frequency-domain signal;
   f) executing an execute threshold restriction process and a tracking window process to the reflection frequency-domain signal;
   g) repeating the step b to step f for obtaining the reflection frequency-domain signals;
   h) generating a distance time-domain signal according to the reflection frequency-domain signals;
   i) executing a damping filter process and a dynamic-range-configuring process to the distance time-domain signal; and
   j) analyzing the processed signal and generating a detecting result.

2. The method of processing FMCW radar signal as claim 1, wherein the method comprises a step of emitting a scan radar signal according to a plurality of the scan frequency values and a frequency-switching time of the configuring parameter set (120) before the step b;
   the method comprises following steps after the step b before the step c:
   executing an analog-to-digital converting process to the analog reflection time-domain signal to obtain the digital reflection time-domain signal; and
   executing a cycling process to the reflection time-domain signal to reduce an intensity of an incomplete cycle part of the reflection time-domain signal.

3. The method of processing FMCW radar signal as claim 1, wherein the step d comprises:
   retrieving a background frequency-domain signal during executing the background-noise-deducting process; and
   filtering out the background frequency-domain signal from the reflection frequency-domain signal for removing a background noise of the reflection frequency-domain signal.

4. The method of processing FMCW radar signal as claim 1, wherein the step f comprises filtering out a reflection frequency (40, 42) having an intensity that is greater than a first threshold (T1) of the configuring parameter set (120) or less than a second threshold of the configuring parameter set (120) from the reflection frequency-domain signal during executing the threshold restriction process.

5. The method of processing FMCW radar signal as claim 1, wherein the step f comprises:
   recognizing a frequency range (54) from the reflection frequency-domain signal during executing the tracking window process, wherein the frequency range (54) is corresponded to a frequency value of the configuring parameter set (120); and
   cutting the reflection frequency-domain signal to make the reflection frequency-domain signal only comprises a part of the reflection frequency-domain signal corresponding to the frequency range (54).

6. The method of processing FMCW radar signal as claim 1, wherein the step i comprises:
   calculating a standard distance value (S) according to a plurality of the distance values (60-70, 80-90) during executing the damping filter process; and
   correcting the plurality of the distance values (60-70, 80-90) according to the standard distance value (S) for making the plurality of the distance values (60-70, 80-90) approach to the standard distance value (S).

7. The method of processing FMCW radar signal as claim 6, wherein the step i further comprises:
   determining a distance upper bound (L1) and a distance lower bound (L2) according to the standard distance value (S) and the configuring parameter set (120) during executing the dynamic-range-configuring process; and
   filtering out the distance value (60-70, 80-90) which is greater than the distance upper bound (L1) or less than the distance lower bound (L2) from the distance time-domain signal.

8. The method of processing FMCW radar signal as claim 7, wherein the step i comprises: selecting another distance value (60-70, 80-90) of the same distance time-domain signal to replace the filtered distance value (60-70, 80-90), wherein the selected distance value (60-70, 80-90) is not greater than the distance upper bound (L1) and not less than the distance lower bound (L2).

9. The method of processing FMCW radar signal as claim 1, wherein the method comprises following steps after the step i:
   repeating the step b to the step d for obtaining the distance time-domain signals; and
   executing a weighted calculation to the distance time-domain signals according to the weighted factors of the configuring parameter set (120) to combine the distance time-domain signals to an output signal;

wherein the step i is to analyze the output signal and generate the detecting result.

* * * * *